United States Patent Office 3,597,272

Patented Aug. 3, 1971

3,597,272

ELECTROPHOTOGRAPHIC ELEMENT AND PROCESS

Eugene P. Gramza and Frederick A. Stahly, Rochester, N.Y., assignors to Eastman Kodak Company, Rochester, N.Y.

No Drawing. Filed Mar. 29, 1968, Ser. No. 717,386
Int. Cl. B44c *1/00*; G03g *5/00*
U.S. Cl. 117—218 6 Claims

ABSTRACT OF THE DISCLOSURE

An imbibition procedure is disclosed as a means for forming an electrically conductive layer on a suitable support. The conductive layer is formed by imbibing a binder-free solution of volatile solvent and a metal-containing semiconductor into an electrically insulating polymeric subcoating carried on a support and evaporating the solvent. The conductive layers are useful in electrophotographic elements.

This invention relates to electrically conducting coatings and their use in electrophotography. In particular, this invention relates to novel means for forming conductive coatings and the use of such coatings in novel photoconductive elements and structures useful in electrophotography.

Electrophotographic imaging processes and techniques have been extensively described in both the patent and other literature, for example U.S. Pat. Nos. 2,221,776; 2,277,013; 2,297,691; 2,357,809; 2,551,582; 2,825,814; 2,833,648; 3,220,324; 3,220,831; 3,220,833 and many others. Generally, these processes have in common the steps of employing a normally insulating photoconductive element which is prepared to respond to imagewise exposure with electromagnetic radiation by forming a latent electrostatic charge image. A variety of subsequent operations, now well known in the art, can then be employed to produce a permanent record of the image.

One type of unitary photoconductive element particularly useful in electrophotography is generally produced in a multi-layer structure. Such an element is prepared by coating a layer of a photoconductive composition onto a film support previously overcoated with a layer of conducting material. In addition, an insulating or barrier layer is often interposed between the conducting material and the photoconductive composition. Previously, the conducting layer in such a photoconductive element was often formed by applying onto the support a separate coating of a film-forming binder having a conducting material dispersed uniformly throughout. However, problems are often encountered with photoconductive elements of this type in that there is often considerable difficulty in obtaining good adhesion between the conducting layer and the substrate, between the photoconductive layer and the conducting layer or between the barrier layer and the conducting layer.

Another limitation of prior uniform dispersions of conducting material in a polymeric binder has been finding a mutual solvent. The conducting materials are often insoluble in the polymer solvent and vice versa.

Furthermore, many prior photoconductive elements are not well suited for use with liquid development. Such elements are subjected to attack by various solvents contained in most liquid developer solutions. In particular, the solvents tend to attack the polymeric binder of the conducting layer.

In addition, many prior photoconductive elements could not be substantially flexed without some degree of crazing which is the result of small cracks developing in the binder of the conducting layer.

It is therefore an object of this invention to provide elements containing new conductive layers which layers have superior adhesion to substrates.

It is a further object of this invention to provide new photoconductive elements having new conductive layers to which overcoated layers readily adhere.

It is another object of this invention to provide new photoconductive elements having new conductive layers that exhibit improved resistance to organic solvents.

Another object is to provide a new method for forming improved conductive layers.

A further object of this invention is to provide electrophotographic elements having novel conductive layers that exhibit improved flexibility.

These and still other objects and advantages are accomplished, in accordance with this invention, by a novel imbibition procedure whereby a binder-free solution of a conducting material is imbibed into an electrically insulating polymeric layer carried on a support.

The imbibed conductive layers of the present invention should be distinguished from previous layers having a uniform dispersion of a conducting material in a binder. In the present invention, the terms layer, imbibed layer or coating when used in reference to the conducting materials, defines a situation wherein one medium is coated so as to be completely or substantially completely absorbed into another material thereby forming a stratum within that material. As a result, the substrate which contains such an imbibibed layer exhibits substantially no discernible dimensional increase over a substrate that does not contain any imbibed conducting materials. In addition, the concentration of the metal-containing semiconductor compound varies directly with the thickness of material into which the semiconductor is imbibed. Thus, the concentration of the conductive material is greater at the upper surface of the substrate. Consequently, there is greater conductivity for a given total concentration of conducting material than would be the case with the same concentration of conducting material evenly dispersed in a binder such as shown by the prior art.

The present effective conductive coatings can be prepared by imbibing a binder-free solution of a metal-containing semiconductor into an insulating polymeric subcoating carried on a support. When a transparent polymeric subcoating is used, the resultant conductive layers are in most instances substantially clear, transparent layers. The transparent nature of the present conductive layers or coatings makes them particularly well suited for use in many photographic and electrophotographic applications.

A preferred method of making such conductive layers is by coating a binder-free solution containing the semiconductor compound solubilized in a volatile solvent. The solution is then imbibed into an electrically insulating polymeric subcoating carried on a suitable support and the solvent is allowed to evaporate. In the case of ordinarily insoluble semiconductor compounds, a complexing agent can be used to effect solubilization in accordance with the procedures in Trevoy U.S. Pat. No. 3,245,833.

Cuprous iodide and silver iodide are the preferred metal-containing semiconductor compounds that we have selected to illustrate certain preferred embodiments of the invention in detail. However, the invention contemplates use of other metal-containing semiconductor compounds, such as other cuprous halides, halides of silver, bismuth, gold, indium, iridium, lead, nickel, palladium, rhenium, tin, tellurium and tungsten; cuprous, cupric and silver thiocyanates; iodomercurates etc.

The useful semiconductor compounds are essentially nonhygroscopic and do not depend upon the presence of moisture for their electrical conductivity. The term "semiconductor" as used herein, defines metal-conducting compounds having an electrical resistivity (specific resistance) in the range of from $10^3$ to $10^9$ ohm-cm., as measured by standard procedures.

The term "surface resistivity" conventionally refers to measurement of electrical leakage across an insulating surface and is usually measured on an insulating surface by a procedure similar to that described in Example 1. In the present specification, however, the term is used with reference to resistance of conducting films that apparently behave as conductors transmitting currents through the body of the coating of electrically conducting material. Resistivity (specific resistance) is the usually accepted measurement for the conductive property of conducting and semiconducting materials. However, in the case of thin conductive coatings, measurement of the conductive property in terms of surface resistivity provides a value that is useful in practice and involves a direct method of measurement. It should be pointed out that the dimensional units for specific resistance (ohm-cm.) and the unit for surface resistivity (ohms per square) as used herein are not equivalent and the respective measurements should not be confused. For an electrically conducting material whose electrical behavior is ohmic, the calculated resistance per square of a film of such material would be the specific resistance of the material divided by the film thickness, but this calculated resistance for a given material will not always coincide with measured surface resistivity.

According to certain preferred embodiments of the invention, conductive coatings are prepared by solution coating methods, using a binder-free coating solution in which a metal-containing semiconductor compound is solubilized in a volatile liquid organic solvent.

By the term volatile we mean capable of being readily evaporated from solution at temperatures low enough to be non-destructive usually below 150° C. The metal-containing semiconductor compounds often are not readily soluble in most volatile solvents such as water and many organic solvents. Therefore, we may employ as a solubilizing agent for the semiconductor compound, a compound that will form a soluble complex with the semiconductor.

Generally alkali metal halides and ammonium halides can be used as complexing agents with silver halides, cuprous halides and with some other semiconducting metal halides such as stannous halides, lead halides and the like to form a complex that is readily soluble in ketone solvents. Usually it is preferable to remove the solubilizing agents by washing in water for example, but in some embodiments the complex salt itself will provide sufficient conductivity. In these later cases, the complex is itself a semiconductor compound. Examples of volatile ketone solvents suitable for dissolving these complexes are acetone, methylethylketone, 2-pentanone, 3-pentanone, 2-hexanone, 2-heptanone, 4-heptanone, methylisopropylketone, ethylisopropylketone, diisopropylketone, methylisobutylketone, methyl t-butylketone, diacetyl, acetyl acetone, acetonyl acetone, diacetone alcohol, mesityl oxide, chloroacetone, cyclopentanone, cyclohexanone, acetophenone and benzophenone. A mixture of ketone solvents can be used or in some embodiments a single ketone solvent can be used. In certain cases, especially when lithium iodide and sodium iodide are used as complexing agents, some solvents which are not ketones may be used to dissolve the iodide complex. Certain solvents such as methyl acetate, ethyl acetate, n-propyl acetate, isopropyl acetate, n-butyl acetate, iso-amyl acetate, terahydrofuran, dimethylformamide, methyl Cellosolve, methyl Cellosolve acetate, ethyl acetate and others can also be used effectively to dissolve the iodide complex.

The present invention is not limited to any particular means for applying the solution and any suitable means can be used such as whirl coating, dip coating, spray coating, bead application on continuous coating machines, wick application to a continuously moving web, hopper coating etc. After imbibition, evaporation of the volatile solvent can be effected by a variety of means with best results being obtained at elevated temperatures. The solution of metal-containing semiconductor compound can be coated onto the polymeric subcoating at a wide range of coverages. Useful results are obtained with coverages ranging from about 4 to about 150 mg./ft.$^2$ with best results being dependent upon the semiconductor material used and the desired end use for the conducting layer.

A wide variety of supports are useful for carrying the coating into which the metal semiconductor compounds are imbibed. Suitable supports would include such materials as wood, glass, paper including coated paper such as polyethylene coated paper; polymeric materials such as polyolefins, for example, polyethylene, polypropylene etc.; polyesters such as poly(ethylene terephthalate) etc.; and other suitable support materials. A particularly useful support material is sold under the name of Estar and is a poly(ethylene terephthalate) having an inherent viscosity [$\eta$] of about 0.6.

Subcoatings which are useful in accordance with this invention include a wide variety of swellable, electrically insulating polymeric materials which will adhere to the support material used. Useful subcoating materials would include polyesters having both aromatic and aliphatic constituents such as those formed with both aromatic and aliphatic dibasic acids, for example a polyester of ethylene glycol and terephthalic and sebacic acids; polyvinyl acetals such as those produced by hydrolyzation of polyvinyl acetate followed by acetalization with formaldehyde or acetaldehyde, for example polyvinyl formal; hydrosol terpolymers, which are three component addition type co-polymers prepared by aqueous emulsion co-polymerization, containing vinylidene chloride as a major constituent, such as a terpolymer of methyl acrylate, vinylidene chloride and itaconic acid as disclosed in U.S. Pat. No. 3,143,421. Other useful materials would also include the so-called tergels which are the subject matter of co-pending Nadeau et al. U.S. application Ser. No. 597,669, filed Nov. 29, 1966, now Pat. No. 3,501,301.

The materials into which the present semiconductor compounds are imbibed can be applied to a suitable support in a variety of ways. Suitable coating means would include dip coating, spray coating, extrusion hopper coating, bead application on a continuous coating machine etc. Coating coverages can vary widely depending upon the materials used and the results desired. Useful results are obtained with coverages of from about 5 to about 50 mg./ft.$^2$.

The electrophotographic elements of the present invention contain a photoconductive layer which can be prepared from a variety of materials. In general, this layer is prepared by dispersing a photoconductor in a resinous binder and coating the resultant dispersion on the conductive layer. Photoconductors suitable for use in the photoconductive layer can include inorganic, organic and organo-metallic materials. Useful photoconductors would include zinc oxide, titanium dioxide, organic derivatives of Group IV*a* and V*a* metals such as those having at least one amino-aryl group attached to the metal atom, aryl amines, polyarylalkanes having at least one amino substituent and the like. The following Table A is a partial listing of U.S. patents disclosing a variety of organic photoconductive compounds and compositions which are useful.

TABLE A

| Inventors: | U.S. Pat. Nos. |
|---|---|
| Schlesinger | 3,139,338 |
| Schlesinger | 3,139,339 |
| Cassiers | 3,140,946 |
| Davis et al. | 3,141,770 |
| Ghys | 3,148,982 |
| Cassiers | 3,155,503 |
| Schlesinger | 3,257,202 |

| Inventors: | U.S. Pat. Nos. |
|---|---|
| Sues et al. | 3,257,203 |
| Sues et al. | 3,257,204 |
| Fox | 3,265,496 |
| Kosche | 3,265,497 |
| Noe et al. | 3,274,000 |

The photoconductive layer can be applied by a variety of means such as swirl coating, spray coating, extrusion hopper coating etc. The amount of photoconductor in the layer can be varied from about 10 to about 60 percent by weight of the total solid.

In addition, if desired, a barrier layer can be interposed between the conductive layer and the photoconductive layer. In general, such barrier layers are formed of a resinous material. Useful barrier materials include polycarbonates such as those disclosed in Gramza and Perry U.S. application Ser. No. 12,470, filed Feb. 18, 1970 entitled "Electrophotographic Element." The coating coverages of these barrier layers can be varied from about 0.04 to about 0.50 g./ft.$^2$ based on the dry weight of the resin.

The following examples are included for a further understanding of the invention.

EXAMPLE 1

A 4 mil. poly(ethylene terephthalate) film base is coated with a coating solution containing 0.4 g. of a poly (vinyl formal) resin containing 5 to 7% poly(vinyl alcohol) and 40 to 50% poly(vinyl acetate), 0.4 g. of a polyisocyanate crosslinking agent containing 75% solids having about 13% isocyanate and 1% free tolylene diisocyanate in ethyl acetate and 2.4 g. of cuprous iodide dissolved in 96.8 g. of acetonitrile. This solution is coated from an extrusion hopper at a dry coverage of 12 mg./ft.$^2$ to form a control coating. Surface resistivity (ohms per square) of the coating is measured by placing 1-inch long graphite electrodes along opposite sides of a 1-inch square on the coated surface. These graphite electrodes are formed by application of an aqueous suspension of colloidal graphite along opposite sides of the square and then drying the applied suspension. Resistance is measured by an electrometer which is an extremely accurate voltmeter particularly suited for measuring high resistance sources, using applied potential of 3 volts D.C. The surface resistivity of this control coating measures $1.0\times10^4$ ohms per square (ohm/sq.). Next a coating is prepared in accordance with this invention. A 4 mil poly (ethylene terephthalate) film base subbed with a hydrosol terpolymer of 14% by weight of acrylonitrile, 80% vinylidene chloride and 6% acrylic acid is coated with a solution of 3.2 g. of cuprous iodide in 96.8 g. of acetonitrile. The solution is coated from an extrusion hopper at a dry coverage of 12 mg./ft.$^2$ and allowed to dry thus forming an imbibed conductive stratum within the subcoating. Although this cuprous iodide solution contains no binder, the resultant conductive layer has excellent adhesion and is very resistant to organic solvents. Next 5.0 g. of poly (ethyleneglycol - co - bishydroxyethoxyphenylpropane terephthalate) sold under the trade name Vitel 101 are dissolved in 47.5 g. of dichloromethane and 47.5 g. of 1,2-dichloroethane. The resultant solution is then coated over the control layer and also over the imbibed layer at a dry coverage of 0.1 g./ft.$^2$. The adhesion of the polyester coating to the imbibed cuprous iodide layer is much greater than the adhesion of the polyester to the control layer. The surface resistivity of the imbibed layer remains at $1.0\times10^4$ ohms per square. Lastly, 20 g. of the above acrylonitrile-vinylidene chloride-acrylic acid terpolymer are dissolved by stirring in 47.5 g. of 2-butanone and 2.5 g. of cyclohexanone. This solution is then overcoated onto a sample of the imbibed cuprous iodide layer and onto a sample of the cotrol layer. The adhesion of terpolymer overcoat on the imbibed layer is improved over that of control layer. The surface resistivity of the overcoated imbibed cuprous iodide layer remains $1.0\times10^4$ ohms per square thus showing no change due to solvent attack. The overcoated imbibed cuprous iodide layer can be overcoated with a photoconductive composition, charged, exposed and toned in the manner disclosed in U.S. Pat. No. 2,297,691 to produce an image.

EXAMPLE 2

An imbibed cuprous iodide conductive coating is prepared by the method of Example 1. The resulting layer has a surface resistivity of $2.0\times10^4$ ohm/sq. This conductive layer is then overcoated by an extrusion hopper with a variety of polymers prepared in a variety of solvents. Table 1 below lists the polymers and solvents used in the overcoat and, in addition, indicates the surface resistivity after the overcoat step.

TABLE 1.—POLYMERS AND SOLVENTS IN OVERCOAT OF CUPROUS IODIDE LAYER

| Polymers | Solvent | Surface resistivity in ohm/sq. |
|---|---|---|
| Poly(butyl methacrylate) | Toluene/methyl ethyl ketone. | $2.0\times10^4$ |
| Vinyl chloride/vinyl acetate co-polymer. | Methyl ethyl ketone | $2.0\times10^4$ |
| Polyvinyl formal | 1,2-dichloroethane | $2.0\times10^4$ |
| Vinylidene chloride polymer | Methyl isobutyl ketone | $2.0\times10^4$ |
| Acrylonitrile vinylidene chloride-acrylic acid terpolymer. | Methyl ethyl ketone/ cyclohexanone. | $2.0\times10^4$ |
| Vinylidene chloride acrylonitrile co-polymer. | Methylisobutyl ketone | $2.0\times10^4$ |
| Organic solvent type thermosetting acrylic ester type prepolymer containing hydroxyl functions to be cross-linked with suitable additives (Rohm and Haas Co.). | Butyl alcohol | $2.0\times10^4$ |

Table 1 above indicates that the imbibed binder-free cuprous iodide layer maintains excellent solvent resistance with a variety of overcoats as shown by the consistently good resistivity. The overcoated imbibed cuprous iodide layers produced above can be further overcoated with a photoconductive composition, charged, exposed and toned in the manner disclosed in U.S. Pat. No. 2,297,691 to produce an image.

EXAMPLE 3

An unsubbed poly(ethylene terephthalate) film support is coated by an extrusion hopper with a solution of 5.0 g. of a polyester of ethylene glycol and isophthalic, terephthalic, sebacic and adipic acids with a molar ratio of acids of 4:4:1:1 dissolved in57.0 g. of 1,2-dichloroethane and 38.0 g. dichloromethane. This coating is at a dry coverage of 0.025 g./ft.$^2$. Next 3.2 g. of cuprous iodide are dissolved in 96.8 g. of acetonitrile. This cuprous iodide solution is then coated by an extrusion hopper onto the previously coated support at a dry coverage of 0.018 g./ft.$^2$. The resulting imbibed cuprous iodide conductive coating has a surface resistivity of $4.0\times10^4$ ohm/sq. This composite layer is then overcoated with the resin/solvent combinations described in Table 1 of Example 2. In all cases, the surface resistivity remains at $4.0\times10^4$ ohm/sq. after the overcoating steps. Thus, this composite layer also is quite resistant to solvent attack. The imbibed cuprous iodide layer is then overcoated with a photoconductive composition. The resultant electrophotographic element is charged, exposed and toned in the manner disclosed in U.S. Pat. No. 2,297,691 to produce an image.

EXAMPLE 4

A 4 mil poly(ethylene terephthalate) film base subbed with the acrylonitrile/vinylidene chloride/acrylic acid terpolymer of Example 1 is coated with a solution of 3.2 g. of cuprous iodide dissolved in 96.8 g. of acetonitrile at a dry coverage of 12 mg./ft.$^2$. The resultant conductive layer has a surface resistivity of $1.0\times10^4$ ohm/sq. Next 3.0 g. of poly(4,4′-isopropylidenediphenol carbonate-b-tetrahydrofuran) is dissolved in 48.5 g. of dichloromethane and 48.5 g. of 1,2-dichloroethane and coated on the above layer by extrusion hopper at a dry coverage of 0.1 g./ft.$^2$. This composite layer is referred to as "composite layer A."

Next a high-speed sensitized photoconductive layer prepared as described in U.S. application Ser. No. 674,006 filed Oct. 9, 1967 is coated from solvent onto composite layer A. This photoconductive composition is prepared from 300 g. of a polycarbonate resin formed from the reaction between phosgene and a dihydroxydiarylalkane or from the ester interchange between diphenylcarbonate and 2,2-bis-4-hydroxy-phenylpropane, 200 g. of 4,4'-benzylidenebis(N,N-diethyl-m-toluidine) and 10 g. of 4-(4-dimethylaminophenyl) - 2,6-diphenyl-thiapyrylium perchlorate in 1700 g. of methylene chloride and 1133.3 g. of 1,1,2-trichloroethane. A solution of the above is sheared in a high-speed blender for a period of time and coated onto composite layer A. Next an electrical contact is provided on the conducting layer of the element carrying composite layer A. This contact is made by removing an area of the photoconductive layer by dissolving it with methylene chloride and then removing the polymeric layer by careful application of ethyl alcohol thus leaving the imbibed conducting layer partially exposed. Then a sheet of semiconducting plastic film is placed into contact with the surface of the exposed conducting layer and held in place by a metallic clamp. An electrical contact is then made to the metal clamp. Next a receiving sheet such as that disclosed in Gramza et al. U.S. application Ser. No. 673,544, filed Oct. 9, 1967, now Pat. No. 3,519,819, entitled "Image Receiving Elements," is placed on a conductive metal plate. The photoconductive element and the receiver sheet are then placed face to face in close proximity in such a manner that there is approximately a 20 micron air gap between the surfaces of the two elements. The spacing in this gap is controlled by the size of the particles extending from the surface of the receiving sheet. The conductive metal plate is connected to the ground side of a power supply and the imbibed conducting layer of the photoconductive element is connected to the high voltage side of the power supply. The photoconductive element on top of the receiving sheet and conducting plate are placed under a photographic microfilm enlarger, marketed by Eastman Kodak Co. under the name of Recordak MEB Enlarger, containing a microfilm negative in the film gate. A latent electrostatic image is placed on the receiver paper by the following procedure; a potential of −1500 volts D.C., with respect to ground, is applied to the conducting layer of the photoconductive element. One second after the beginning of the application of potential, the photoconductive element is exposed for a period of one second. The intensity level at the photoconductor is three foot candles. The −1500 volt potential is applied throughout this exposure and is terminated one-half second after the exposure is completed. The power supply is then reversed so that a post-exposure potential of +1200 volts D.C., with respect to ground, is applied to the photoconductive element. The duration of this post-exposure potential is one second. Next the photoconductive element and the receiving sheet are separated, and the receiving sheet bearing the electrostatic image is developed by immersing in a positive polarity liquid electrophotographic developer as described in U.S. Pat. No. 2,907,674. The resultant image is a positive appearing reproduction of the negative original, displaying dense, sharp, black characters with uniform low density in the background. This same procedure is again followed using the control coating of Example 1 which is overcoated with a cellulose nitrate barrier layer and the same photoconductive composition referred to above. The composite layer A generally performs better in producing images than the overcoated control coating of Example 1. In addition, when the upper two layers over the imbibed cuprous iodide layer are cleaned by solvent scrubbing in order to make the necessary electrical contact, the imbibed cuprous iodide layer remains wholly intact and retains its surface resistivity of $1.0\times10^4$ ohm sq.; whereas the control cuprous iodide coating, when solvent scrubbed in a similar manner, normally gains in surface resistivity which is not desirable. Thus, it is readily apparent that the new imbibed cuprous iodide layer has superior resistance to solvent attack than does the coating used in the control element.

EXAMPLE 5

Silver iodide (7.66 g.) is added to 2.14 g. of potassium iodide and 186 g. of 2-butanone and the mixture is stirred until all solids dissolve. This 5% solids solution of silver iodide-potassium iodide complex is coated onto a 4 mil poly(ethylene terephthalate) film base subbed with a terpolymer of 6% by weight acrylic acid, 14% acrylonitrile and 80% vinylidene chloride. The solution is coated from an extrusion hopper at varying dry coverages. The uncoated film base is used as a control and is measured as above for surface resistivity. Next three strips of the film base are coated with the above solution at dry coverage rates of 30, 50 and 100 mg./ft.$^2$, respectively, and each is measured for surface resistivity. The control and the three imbibed coatings are also examined for transparency. The results of these measurements are given in the following table.

TABLE 2

| Coating No. | AgI-KI dry coverage (mg./ft.$^2$) | Surface resistivity (ohms/sq.) | Appearance |
|---|---|---|---|
| Control | | $>1\times10^{12}$ | Clear. |
| 1 | 30 | $1.1\times10^8$ | Slight haze. |
| 2 | 50 | $1.3\times10^7$ | Hazy. |
| 3 | 100 | $5.2\times10^6$ | Do. |

The above imbibed silver iodide conductive layers are then used to prepare a photoconductive element as in Example 4 which element is charged, exposed and toned to produce an image as in the preceding example.

In addition to their use in electrophotography, the conductive layers of this invention can be used to provide antistatic, electrically conductive surfaces or subcoatings on a variety of supports, and especially to provide a conductive surface layer on an insulating subcoat. For example, the conductive coatings can be applied as a subcoating to serve as an electrode on an insulating base, thus providing a conductive base for electrophoretic application of subsequent coatings. Metal plating can thus be applied to the surface of articles made of insulating synthetic resins.

This invention has been described in detail with particular reference to certain preferred embodiments thereof, but it will be understood that variations and modfications can be effected within the spirit and scope of the invention as described hereinabove and as defined in the appended claims.

We claim:

1. A method for forming an imbibed electrically conductive layer of a metal-containing semiconductor compound onto an insulating support comprising the steps of coating a subcoating of a swellable, electrically insulating polymeric material onto said support, forming a solution containing said semiconductor compound in a volatile organic solvent which is a swelling agent for said polymeric material, the solution being free of any resinous binder, coating the solution onto the subcoating, allowing the solution to be imbibed into the swelled subcoating and evaporating the volatile solvent to form an imbibed network of the semiconductor compound in the subcoating.

2. A method as in claim 1 wherein the polymeric material is selected from the group consisting of a polyester having both aromatic and aliphatic constituents, a polyvinyl acetal and a hydrosol terpolymer containing vinylidene chloride as the major constituent.

3. A method as in claim 2 wherein the metal-containing semiconductor compound is selected from the group consisting of cuprous iodide and silver iodide.

4. The method of claim 1 wherein the volatile solvent is acetonitrile.

5. A method for forming an imbibed electrically conductive layer of a metal-containing semiconductor compound onto an insulating support, said method comprising the steps of coating a subcoating of a swellable, electrically insulating polymeric material on said support, solubilizing said semiconductor compound by means of a complexing agent that forms a soluble complex with the semiconductor compound, dissolving the solubilized semiconductor compound in a volatile organic solvent which is a swelling agent for said polymeric material, the solution being free of any resinous binder, coating the solution onto the subcoating, allowing the solution to be imbibed into the swelled subcoating and evaporating the volatile solvent to form an imbibed network of the semiconductor compound in the subcoating.

6. The method of claim 5 wherein said semiconductor compound is silver iodide.

References Cited

UNITED STATES PATENTS

| | | | |
|---|---|---|---|
| 3,283,309 | 11/1966 | Gaynor | 240—173 |
| 3,373,020 | 3/1968 | Tomanek | 96—1.5 |

GEORGE F. LESMES, Primary Examiner

M. B. WITTENBERG, Assistant Examiner

U.S. Cl. X.R.

96—1.5; 117—71, 72